United States Patent
Ahn et al.

(10) Patent No.: US 12,489,776 B2
(45) Date of Patent: Dec. 2, 2025

(54) ELECTRONIC DEVICE AND CONTROL METHOD THEREOF

(71) Applicant: SAMSUNG ELECTRONICS CO., LTD., Suwon-si (KR)

(72) Inventors: Gailjoon Ahn, Suwon-si (KR);
Junbum Shin, Suwon-si (KR);
Choonghoon Lee, Suwon-si (KR);
Kyungsun Cho, Suwon-si (KR);
Wonhyuk Kang, Suwon-si (KR);
Soonhong Kwon, Suwon-si (KR);
Taeho Kgil, Suwon-si (KR); Eungjun Kim, Suwon-si (KR); Chungyong Eom, Suwon-si (KR); Dongik Lee, Suwon-si (KR); Youngman Jung, Suwon-si (KR); Jongmin Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 386 days.

(21) Appl. No.: 17/959,145

(22) Filed: Oct. 3, 2022

(65) Prior Publication Data

US 2023/0027977 A1  Jan. 26, 2023

Related U.S. Application Data

(63) Continuation of application No. PCT/KR2021/001042, filed on Jan. 27, 2021.

(30) Foreign Application Priority Data

Apr. 3, 2020  (KR) .................. 10-2020-0041102

(51) Int. Cl.
*H04L 9/40* (2022.01)
*H04L 51/52* (2022.01)

(52) U.S. Cl.
CPC .......... *H04L 63/1433* (2013.01); *H04L 51/52* (2022.05)

(58) Field of Classification Search
CPC ..... G06F 21/62; H04L 51/52; H04L 63/0407; H04L 63/105; H04L 63/107; H04L 63/1433
See application file for complete search history.

(56) References Cited

U.S. PATENT DOCUMENTS 7,269,578 B2  9/2007  Sweeney
7,698,250 B2  4/2010  Dwork et al.
(Continued)

FOREIGN PATENT DOCUMENTS

EP  3 101 584  12/2016
JP  2009-43144  2/2009
(Continued)

OTHER PUBLICATIONS

International Search Report for PCT/KR2021/001042 dated May 18, 2021, 4 pages.
(Continued)

*Primary Examiner* — Gary S Gracia
(74) *Attorney, Agent, or Firm* — NIXON & VANDERHYE P.C.

(57) ABSTRACT

An electronic device may: when a first piece of content is acquired, acquire a first score for the relationship between the first piece of content and the privacy of a user of the electronic device, on the basis of information about a person included in the first piece of content and information about an event included in the first piece of content; acquire a second score for the security of each of at least one application which can access the first piece of content; and, when a request for accessing the first piece of content via a first application from among the at least one application is
(Continued)

received, determine whether or not to block access to the first piece of content via the first application, on the basis of the first score corresponding to the first piece of content and the second score corresponding to the first application.

14 Claims, 10 Drawing Sheets

(56) References Cited

U.S. PATENT DOCUMENTS

| | | | |
|---|---|---|---|
| 8,131,808 B2 | 3/2012 | Aoki et al. | |
| 8,630,422 B2 | 1/2014 | Gentry | |
| 8,925,099 B1* | 12/2014 | Saxe | G06F 21/6245 |
| | | | 713/187 |
| 9,361,469 B2 | 6/2016 | Thiyagarajan et al. | |
| 10,032,172 B2 | 7/2018 | Barday | |
| 10,127,403 B2 | 11/2018 | Kong et al. | |
| 10,146,925 B1* | 12/2018 | Rosenberg | G06F 21/32 |
| 10,187,520 B2 | 1/2019 | Seo et al. | |
| 10,198,597 B2 | 2/2019 | Ekamgaram et al. | |
| 10,438,011 B2 | 10/2019 | Ueda | |
| 10,469,484 B1* | 11/2019 | Chen | H04L 63/0853 |
| 10,541,999 B1* | 1/2020 | Rosenberg | G06V 40/172 |
| 10,671,877 B2 | 6/2020 | Choi et al. | |
| 11,100,249 B2 | 8/2021 | Suh et al. | |
| 11,263,299 B2* | 3/2022 | Gonser | H04L 63/1425 |
| 2010/0306834 A1* | 12/2010 | Grandison | G06F 21/6245 |
| | | | 709/205 |
| 2014/0041056 A1* | 2/2014 | Stoop | G06F 21/6263 |
| | | | 726/28 |
| 2014/0359783 A1* | 12/2014 | Vera | G06F 21/6245 |
| | | | 726/26 |
| 2016/0359826 A1* | 12/2016 | Clark | H04L 63/0807 |
| 2017/0235975 A1* | 8/2017 | Iwanami | G06F 21/64 |
| | | | 726/28 |
| 2017/0255792 A1 | 9/2017 | Kim et al. | |
| 2017/0329966 A1* | 11/2017 | Koganti | G06F 21/56 |
| 2018/0114054 A1* | 4/2018 | Dow | G06V 40/172 |
| 2018/0157668 A1* | 6/2018 | Raichelgauz | G06F 16/4393 |
| 2018/0189510 A1* | 7/2018 | Seko | H04W 12/06 |
| 2018/0247075 A1* | 8/2018 | Aistrope | G06F 16/51 |
| 2019/0066686 A1* | 2/2019 | Baracaldo Angel | |
| | | | G10L 21/0208 |
| 2020/0184278 A1* | 6/2020 | Zadeh | G06N 3/044 |
| 2020/0311305 A1* | 10/2020 | Kim | G06T 3/4015 |
| 2020/0410980 A1* | 12/2020 | Yamada | G06F 3/167 |
| 2022/0129497 A1* | 4/2022 | Jin | G06V 10/751 |
| 2022/0172518 A1* | 6/2022 | Tang | G06V 10/443 |
| 2022/0188452 A1* | 6/2022 | Song | G06F 16/5846 |
| 2022/0300653 A1* | 9/2022 | Wrenn | G06F 21/6272 |
| 2023/0027977 A1* | 1/2023 | Ahn | H04L 51/52 |
| 2023/0096240 A1* | 3/2023 | Biswas | G06V 40/168 |
| | | | 726/25 |
| 2023/0195935 A1* | 6/2023 | Tormasov | G06F 21/31 |
| | | | 726/26 |
| 2023/0216964 A1* | 7/2023 | Ramadhane | G06F 21/84 |
| | | | 709/204 |
| 2023/0401332 A1* | 12/2023 | Vahidnia | H04L 63/101 |
| 2025/0156552 A1* | 5/2025 | Bhoyar | G06F 21/577 |

FOREIGN PATENT DOCUMENTS

| | | |
|---|---|---|
| JP | 2011-155385 | 8/2011 |
| JP | 2015-143995 | 8/2015 |
| JP | 2017-162138 | 9/2017 |
| KR | 10-2014-0027603 | 3/2014 |
| KR | 10-2014-0127722 | 11/2014 |
| KR | 10-2016-0089711 | 7/2016 |
| KR | 10-2016-0116037 | 10/2016 |
| KR | 10-2017-0015129 | 2/2017 |
| KR | 10-2017-0102635 | 9/2017 |
| KR | 10-1881391 | 7/2018 |

OTHER PUBLICATIONS

Written Opinion of the ISA for PCT/KR2021/001042 dated May 18, 2021, 8 pages (with English Translation).

Korean Office Action dated Dec. 20, 2024 for KR Application No. 10-2020-0041102.

* cited by examiner

FIG. 4

| FILE NAME | PERSON | RELATIONSHIP | TIME | LOCATION | PLACE | EVENT | SENSITIVITY INFORMATION | FIRST SCORE |
|---|---|---|---|---|---|---|---|---|
| 0×2380 9802 (IMG24 5.jpg) | KIM CHEOL-SOO PARK YOUNG-HEE LEE MIN-HO | [KIM CHUL-SOO] 0.04 [PARK YOUNG-HEE] 0.13 [LEE MIN-HO] 0.16 | 2018-09-14 14:38:78 | [LAT] 116.84803423 [LON] 028.24328932 [ALT] 195.23423489 | RESTAURANT A IN KANGNAM STATION (YEOKSAM-DONG, GANGNAM-GU, SEOUL) | FRIEND GET-TOGETHER (0.26) | N/A (No Critical) | 0.32 |
| 0×6757 2342 (IMG93 3.jpg) | LEE MIN-KYUNG JEONG SANG-HO | [LEE MIN-KYUNG] 0.76 [JEONG SANG-HO] 0.04 | 2018-10-03 19:12:32 | [LAT] 123.23414354 [LON] 024.34547652 [ALT] 123.43545244 | CAF? B IN SAMSUNG STATION (SAMSUNG-DONG, GANGNAM-GU, SEOUL) | INTRODUCTION MEETING (0.58) | N/A (No Critical) | 0.53 |
| 0×3453 4345 (IMG12 01.jpg) | N/A | [N/A] N/A | 2018-12-25 22:12:18 | [LAT] 134.83243423 [LON] 032.34224336 [ALT] 094.42235689 | INCHEON INTERNATIONAL AIRPORT (UNSEO-DONG, JUNG-GU, INCHEON) | TRAVEL PHOTO (AIRLINE TICKET/ PASSPORT) (0.47) | M34280934 (PASSPORT NO.) 1234567 (SOCIAL SECURITY NO.) CZ679 7845513 (AIRLINE TICKET) | 0.41 |
| ×87456 44524 (IMG23 54.jpg) | N/A | [N/A] N/A | 2019-03-05 09:56:12 | [LAT] 123.23424234 [LON] 023.23423446 [ALT] 086.24253614 | C ELECTRONICS, WOOMYUN-DONG (WOOMYUN-DONG, SEOCHO-GU, SEOUL) | INSURANCE PROCESSING PHOTO (IDENTIFICATION CARD/ACCOUNT) (0.92) | 800505- 1234567 (SOCIAL SECURITY NO.) 135-2469- 9487 (ACCOUNT NO.) | 0.88 |

ELECTRONIC DEVICE AND CONTROL METHOD THEREOF

CROSS-REFERENCE TO RELATED APPLICATIONS

This application is a continuation of International Application No. PCT/KR2021/001042, filed Jan. 27, 2021, designating the United States, in the Korean Intellectual Property Receiving Office, and claiming priority to KR Patent Application No. 10-2020-0041102, filed Apr. 3, 2020, the disclosures of which are all hereby incorporated by reference herein in their entireties.

BACKGROUND

Field

Various example embodiments may relate to an electronic device and/or a control method of the electronic device, and for example, to an electronic device capable of protecting the privacy of a user in consideration of a relationship between each content and the privacy of an individual user, and/or a control method thereof.

Description of Related Art

In recent years, the amount of content acquired through user terminals including smartphones has been explosively increased, and the development of a technology allowing acquired content to be quickly and easily shared with an external device has been accelerated. However, on the other hand, as the content acquired from user terminals is leaked to the outside against a users' intention, a problem in which the users' privacy is violated also frequently arises.

Meanwhile, there is a related art that grants access to a wide range of content for each application under the users' consent, but according to this, there is a limit in that protection for each individual content is insufficient. In addition, there is a related art that allows a user to select whether to block access to each individual content, but this also has a limitation in that a user should manually select whether to block access to each content or individual user's own privacy is not considered.

Accordingly, there is a need for a technology capable of overcoming the limitations of the related art and protecting the users' privacy in consideration of a relationship between each content and the users' privacy.

SUMMARY

Various example embodiments may provide an electronic device capable of protecting users' privacy in consideration of a relationship between each content and the individual users' privacy, and/or a control method thereof.

According to an example embodiment, an electronic device may include a memory configured to store at least one instruction; and a processor which may be configured to execute the at least one instruction, wherein the processor may be configured to, when first content is acquired, acquire a first score for a relationship between the first content and privacy of a user of the electronic device based on information on a person included in the first content and information on an event included in the first content, acquire a second score for security of each of at least one application that is able to access the first content, and determine whether to, when a request to access the first content through a first application, among the at least one application, is received, block access to the first content through the first application based on the first score corresponding to the first content and the second score corresponding to the first application.

The information on a person may include at least one of: information on the user, information on another person different from the user, and/or information on a relationship between the user and the other person.

The information on the relationship between the user and the other person may be acquired based on at least one of information on messages transmitted and received between the user and the other person, information acquired through a second application related to social media of the other person, and information included in second content related to the other person.

Meanwhile, the information on the event may be acquired based on at least one of information on an acquisition time of the first content, information on an acquisition location of the first content, and/or information on the user's schedule.

Meanwhile, the processor may be configured to acquire the second score for the first application based on at least one of information on security of a channel for transmitting data for the first application and/or information on security of a server receiving the data for the first application.

Meanwhile, the processor may be configured to block access to the first content through the first application, when a value obtained by subtracting the first score corresponding to the first content from the second score corresponding to the first application is less than a predetermined threshold value.

The processor may be configured to, when it is determined to block access to the first content through the first application, provide a list of contents excluding the first content to the first application.

Meanwhile, the processor may be configured to, when it is determined to block access to the first content through the first application, anonymize at least a portion of the first content and provide the first content in which at least a portion thereof is anonymized to the first application.

The electronic device may further include: a communication device, wherein the processor may be configured to control the communication device to transmit the first content to an external device through a predetermined communication protocol, when the value obtained by subtracting the first score corresponding to the first content from the second score corresponding to the first application is less than the predetermined threshold value.

The electronic device may further include: an output device, wherein, when the value obtained by subtracting the first score corresponding to the first content from the second score corresponding to the first application is less than the predetermined threshold value, a user interface for selecting whether to block access to the first content may be provided through the output device.

According to another example embodiment, a control method of an electronic device, may include: when first content is acquired, acquiring a first score for a relationship between the first content and privacy of a user of the electronic device based on information on a person included in the first content and information on an event included in the first content; acquiring a second score for security of each of at least one application that is able to access the first content; and determining whether to, when a request to access the first content through a first application, among the at least one application, is received, block access to the first content through the first application based on the first score corresponding to the first content and the second score corresponding to the first application.

The information on a person may include at least one of information on the user, information on another person different from the user, and/or information on a relationship between the user and the other person.

The information on the relationship between the user and the other person may be acquired based on at least one of information on messages transmitted and received between the user and the other person, information acquired through a second application related to social media of the other person, and/or information included in second content related to the other person.

Meanwhile, the information on the event may be acquired based on at least one of information on an acquisition time of the first content, information on an acquisition location of the first content, and information on the user's schedule.

The acquiring of the second score may include: acquiring the second score for the first application based on at least one of information on security of a channel for transmitting data for the first application and information on security of a server receiving the data for the first application The determining may include blocking access to the first content through the first application, when a value obtained by subtracting the first score corresponding to the first content from the second score corresponding to the first application is less than a predetermined threshold value.

The method may further include: when it is determined to block access to the first content through the first application, providing a list of contents excluding the first content to the first application.

The method may further include: when it is determined to block access to the first content through the first application, anonymize at least a portion of the first content and provide the first content in which at least a portion thereof is anonymized to the first application.

The method may further include: transmitting the first content to an external device through a predetermined communication protocol, when the value obtained by subtracting the first score corresponding to the first content from the second score corresponding to the first application is less than the predetermined threshold value.

According to an example embodiment, a computer-readable recording medium may be provided including a program executing a control method of an electronic device, wherein the control method of the electronic device may include: when first content is acquired, acquiring a first score for a relationship between the first content and privacy of a user of the electronic device based on information on a person included in the first content and information on an event included in the first content; acquiring a second score for security of each of at least one application that is able to access the first content; and determining whether to, when a request to access the first content through a first application, among the at least one application, is received, block access to the first content through the first application based on the first score corresponding to the first content and the second score corresponding to the first application.

BRIEF DESCRIPTION OF DRAWINGS

The above and other aspects, features, and advantages of certain example embodiments will be more apparent from the following detailed description, taken in conjunction with the accompanying drawings, in which:

FIG. 4 is a table illustrating various information used in the process of acquiring a first score according to an example embodiment;

DETAILED DESCRIPTION

Figure 1:
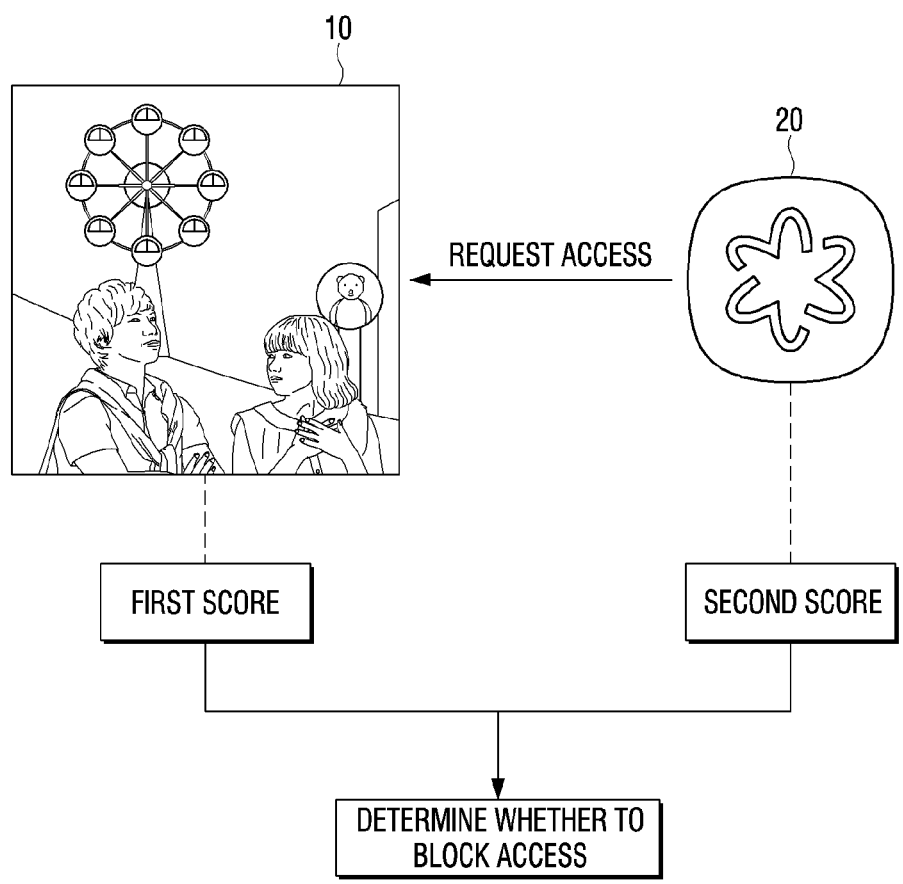
FIG. 1 is a conceptual diagram schematically illustrating a control process of an electronic device according to an example embodiment.

The present disclosure may be variously modified and have several embodiments, and the specific example embodiments of the present disclosure are thus shown in the drawings and described in detail in the detailed description. However, it is to be understood that technologies mentioned in the present disclosure are not limited to the specific embodiments, and include various modifications, equivalents, and/or alternatives according to the embodiments of the present disclosure. Throughout the accompanying drawings, similar components are denoted by similar reference numerals.

In describing example embodiments of the present disclosure, when it is decided that a detailed description for the known functions or configurations related to the present disclosure may unnecessarily obscure the gist of the present disclosure, the detailed description thereof is omitted.

In addition, the following embodiments may be modified in several different forms, and the scope and spirit of the present disclosure are not limited to the following embodiments. Rather, these embodiments are provided to make the present disclosure thorough and complete, and to transfer the spirit to those skilled in the art.

Terms used in the present disclosure are used only to describe the specific embodiments rather than limiting the scope of the present disclosure. Terms of a singular form may include plural forms unless explicitly indicated otherwise.

In the present disclosure, the expression "have," "may have," "include," "may include" or the like, indicates existence of a corresponding feature (for example, a numerical value, a function, an operation or a component, such as a part), and does not exclude existence of an additional feature.

In the present disclosure, the expression "A or B," "least one of A and/or B" or "one or more of A and/or B" or the like, may include all possible combinations of items enumerated together. For example, "A or B," "at least one of A and B," or "at least one of A or B" may indicate all of 1) a case where at least one A is included, 2) a case where at least one B is included, or 3) a case where both of at least one A and at least one B are included.

The expressions "first," "second" and the like, used in the present disclosure may indicate various components regardless of a sequence and/or importance of the components.

These expressions are only used in order to distinguish one component from the other components, and do not limit the corresponding components.

In case that any component (for example, a first component) is mentioned to be "(operatively or communicatively) coupled with/to" or "connected to" another component (for example, a second component), it is to be understood that the any component is directly coupled to the other component or may be coupled to the another component through other component(s) (for example, a third component).

Meanwhile, in case that any component (for example, the first component) is mentioned to be "directly coupled" or "directly connected to" another component (for example, the second component), it is to be understood that the other component (for example, the third component) is not present between any component and another component.

An expression "configured (or set) to" used in the present disclosure may be replaced by an expression "suitable for," "having the capacity to," "designed to," "adapted to," "made to" or "capable of" based on a situation. A term "configured (or set) to" may not necessarily indicate "specifically designed to" in hardware.

Instead, an expression "an apparatus configured to" may indicate that the apparatus may "perform-" together with other apparatuses or components. For example, "a processor configured (or set) to perform A, B, and C" may indicate a dedicated processor (for example, an embedded processor) for performing the corresponding operations or a generic-purpose processor (for example, a central processing unit (CPU) or an application processor) that may perform the corresponding operations by executing one or more software programs stored in a memory apparatus.

In the embodiments, a "module" or a "~er/or" may perform at least one function or operation, and be implemented by hardware or software or be implemented by a combination of hardware and software. In addition, a plurality of "modules" or a plurality of "~ers/ors" may be integrated in at least one module and be implemented by at least one processor except for a "module" or an "~er/or" that needs to be implemented by specific hardware.

Meanwhile, various elements and regions in the drawings are schematically illustrated. Therefore, the spirit of the present disclosure is not limited by relative sizes or intervals shown in the accompanying drawings.

Hereinafter, embodiments of the present disclosure will be described in detail with reference to the accompanying drawings so that those skilled in the art to which the present disclosure pertains may easily practice the present disclosure.

FIG. 1 is a conceptual diagram briefly illustrating a control process of an electronic device according to an example embodiment.

According to an example embodiment, an electronic device may acquire a first score regarding a relationship between a first content 10 and a user's privacy based on information on a person included in the first content 10 and information on an event included in the first content 10.

In describing the present disclosure, the term of content is used to collectively refer to terms, such as data and resources, as well as content, such as image content, voice content, and text content, etc. In addition, the term of the first content 10 is used as a meaning of specifying one content among a plurality of contents that the electronic device may acquire. Hereinafter, a process of acquiring information on a person included in the first content 10 and a process of acquiring information on an event included in the first content 10 are first described, and then a process of acquiring the first score regarding a relationship between the first content 10 and the user's privacy is described.

When the first content 10 is acquired, the electronic device may acquire information on a person included in the first content 10. The information on a person may include information on a user of the electronic device, information on another person different to the user, and information on a relationship between the user and the other person. Hereinafter, for convenience of description, a user of the electronic device is simply referred to as a 'user', and a person included in the first content 10 is simply referred to as an 'other person', who is a different person from the user.

Specifically, the electronic device may identify a person included in the first content 10. In particular, when the first content 10 includes an image, the electronic device may perform object recognition on the image included in the content to identify an object included in the first content 10 and identify a person corresponding to the identified object as a person included in the first content 10. Here, if the person identified as being included in the first content 10 is a person other than the user, the electronic device may acquire information on a relationship between the user and the other person based on at least one of information on messages transmitted and received between the user and the other person, information acquired through an application related to social media of the other person, and information included in second content related to the other person.

For example, when the first content 10 includes an image, the electronic device may perform object recognition on the acquired image to identify an object included in the first content 10, and identify that the identified object corresponds to a person named Nicole based on pre-stored contact information or personal information including face information of acquaintances. When it is identified that the person included in the first content 10 is Nicole, the electronic device may acquire information indicating that "a relationship between the user and Nicole is lovers" based on the information on messages transmitted and received between Nicole and the user of the electronic device, information included in the second content related to Nicole, etc.

Meanwhile, when the first content 10 is acquired, the electronic device may acquire information on an event included in the first content 10. The information on the event may be acquired based on at least one of information on an acquisition time of the first content 10, information on an acquisition location of the first content 10, and information on the user's schedule.

For example, the electronic device may acquire information indicating that the event included in the first content 10 is "amusement park date with Nicole" based on information indicating that the first content 10 was acquired at 7 p.m. on Dec. 24, 2019, information indicating that the first content 10 was acquired at an amusement park, and information on a schedule that the user had an appointment with Nicole on Dec. 24, 2019.

As described above, when the information on a person included in the first content 10 and information on an event included in the first content 10 are acquired, the electronic device may acquire a first score regarding a relationship between the first content 10 and the user's privacy based on the information on a person included in the first content 10 and the information based on the event included in the first content 10.

The 'first score' is a numerical value of sensitivity of the content, and specifically, refers to a measure indicating how closely related information included in each content is with the user's privacy.

Specifically, the first score may be acquired according to a predefined rule based on information on a person included in the first content 10 and information on the event included in the first content 10 and may also be acquired through an artificial intelligence model trained to output the first score corresponding to the input information on a person included in the first content 10 and the information on the event included in the first content 10.

Hereinafter, it is assumed that a higher value of the first score represents higher sensitivity of the content and a maximum or large value of the first score is 1.0.

For example, as in the above example, as information on a person included in the first content 10, when the information indicating that "the relationship between the user and Nicole is lovers" is acquired as information on a person included in the first content 10 and the information of "amusement park date with Nicole" is acquired as information on the event included in the first content 10, the electronic device may acquire "0.51" as the first score for the first content 10. For another example, when the information indicating that the "relationship between the user and Nicole is a lover" is acquired as information on a person included in the first content 10 and information of "pool date with Nicole" is acquired as information on an event included in the first content 10, the electronic device may acquire "0.75" as a first score for the first content 10. As another example, when information indicating that "the relationship between the user and Nicole is ex-lovers" is acquired as information on a person included in the first content 10 and information of "amusement park date with Nicole" is acquired as information on an event included in the first content 10, the electronic device may acquire "0.97" as the first score for the first content 10.

In the above, the process of acquiring the first score regarding the relationship between the user of the first content 10 and the user's privacy based on the information on a person included in the first content 10 and the information on the event included in the first content 10 has been described, but a risk of external leakage of information related to the user's privacy included in the content varies depending on the application that accesses the content, so even in the case of the same content, whether to block an access may be determined to be different depending on which application accesses the content.

Accordingly, the electronic device according to an example embodiment may acquire a second score for the security of each of at least one application that may access the first content 10. Specifically, the electronic device may acquire a second score on a first application 20 based on information on security of a channel transmitting data for the first application 20 and information on security of a server receiving the data for the first application 20.

In describing the present disclosure, the term "application" is used as a generic term for services, such as web services, as well as applications and programs, and the term of "first application 20" is used to specify a single application that may access the first content 10, among a plurality of applications included in the electronic device. It is used in the meaning of specifying one application that may access the first content 10.

The 'second score' is a numerical value of security of an application, and specifically, refers to a measure indicating a risk that information related to the user's privacy included in the content is leaked to an external device without permission through each application.

Specifically, the second score may not only be acquired according to a predefined rule based on information on the security of a channel for transmitting data for the first application 20 and information on the security of a server that receives the data for the first application 20, but also be acquired through an artificial intelligence model trained to output the second score corresponding input information for the information on the security of the channel for transmitting data for the first application 20 and information on the security of the server that receives the data for the first application 20.

Hereinafter, in the description of the present disclosure, it is assumed that a higher value of the second score represents an application having a higher security and a maximum or large value of the second score is 1.0.

For example, when information indicating that a channel for transmitting data for the first application 20 performs communication with a server through hypertext transfer protocol (HTTP) is acquired and evaluation information indicating that the security of the server that receives the data for the first application 20 is low is acquired, the electronic device may acquire "0.90" as the second score for the first application 20. Meanwhile, when information indicating that the channel for transmitting data for the first application 20 performs communication with the server through hypertext transfer protocol secure (HTTPS) is acquired and evaluation information indicating that the security of the server that receives the data for the first application 20 is high is acquired, the electronic device may acquire "0.10" as the second score for the first application 20.

Meanwhile, when a request for accessing the first content 10 is received through the first application 20 among at least one application, the electronic device may determine whether to block access to the first content 10 through the first application 20 based on the first score corresponding to the first content 10 and the second score corresponding to the first application 20.

Specifically, if a value obtained by subtracting the first score corresponding to the first content 10 from the second score corresponding to the first application 20 is less than a predetermined threshold value, the electronic device may determine to block access to the first content 10 through the first application 20. Conversely, if the value obtained by subtracting the first score corresponding to the first content 10 from the second score corresponding to the first application 20 is equal to or greater than the predetermined threshold value, the electronic device determine not to block access to the first content 10 through the first application 20.

In other words, the electronic device may allow access to the first content 10 through the first application 20 only when the security of the first application 20 is high enough to sufficiently offset the sensitivity of the first content 10. The predetermined threshold value is a criterion for determining whether it is safe to access the first content 10 through the first application 20, and may of course be changed by the electronic device or the user.

For example, if the threshold value is previously set to "0.20", the second score corresponding to the first application 20 is "0.70", and the first score corresponding to the first content 10 is "0.60", then a value obtained by subtracting the first score corresponding to the first content 10 from the second score corresponding to the first application 20 is "0.10" that is less than the predetermined threshold value, and thus, the electronic device may determine to block access to the first content 10 through the first application 20. Meanwhile, if the threshold value is previously set to "0.20", the second score corresponding to the first application 20 is "0.70", and the first score corresponding to the first content 10 is "0.40", then a value obtained by subtracting the first score corresponding to the first content 10 from the second score corresponding to the first application 20 is "0.30" that is greater than or equal to the predetermined threshold value, and thus, the electronic device may determine not to block access to the first content 10 through the first application 20.

As another example, if the threshold value is previously set to "0.20", the second score corresponding to the first application 20 is "0.90", and the first score corresponding to the first content 10 is "0.60", then a value obtained by subtracting the first score corresponding to the first content 10 from the second score corresponding to the first application 20 is "0.30" that is greater than or equal to the predetermined threshold value, and thus, the electronic device may determine not to block access to the first content 10 through the first application. Meanwhile, if the threshold value is previously set to "0.20", the second score corresponding to the first application 20 is "0.50", and the first score corresponding to the first content 10 is "0.60", then a value obtained by subtracting the first score corresponding to the first content 10 from the second score corresponding to the first application 20 corresponding to the first content 10 is "−0.10" that is less than the predetermined threshold value, and thus, the electronic device may determine to block access to the first content 10 through the first application 20. When it is determined to block access to the first content 10 through the first application 20, the electronic device may provide a list of contents excluding the first contents 10 to the first application 20. Other various embodiments related to blocking access to the first content 10 through the first application 20 are described below.

According to an example embodiment as described above, the user's privacy may be protected in consideration of the relationship between each content and the privacy of the individual user.

Hereinafter, various embodiments are described in more detail based on the configuration of the electronic device.

Figure 2:
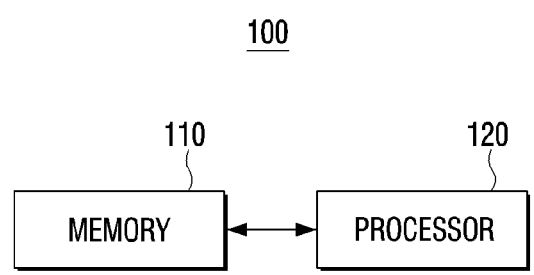
FIG. 2 is a block diagram schematically illustrating a configuration of an electronic device 100 according to an example embodiment.

FIG. 2 is a block diagram schematically illustrating a configuration of an electronic device 100 according to an example embodiment.

As shown in FIG. 2, the electronic device 100 according to an example embodiment may include a memory 110 and a processor 120.

At least one command related to the electronic device 100 may be stored in the memory 110. In addition, an operating system (O/S) for driving the electronic device 100 may be stored in the memory 110. In addition, various software programs or applications for operating the electronic device 100 according to various embodiments may be stored in the memory 110. In addition, the memory 110 may include a semiconductor memory, such as a flash memory, or a magnetic storage medium, such as a hard disk.

Specifically, various software modules for operating the electronic device 100 may be stored in the memory 110 according to various embodiments, and the processor 120 may control the operation of the electronic device 100 by executing various software modules stored in the memory 110. That is, the memory 110 may be accessed by the processor 120, and reading/writing/modifying/deleting/updating of data may be performed by the processor 120.

Meanwhile, the term of memory 110 may be used to refer to the memory 110, a ROM (not shown) in the processor 120, a RAM (not shown), or a memory card (not shown) mounted in the electronic device 100 (e.g., micro SD card, memory stick).

In particular, in various embodiments, a plurality of contents including first content, data for a plurality of applications including a first application, information on a person included in the first content, information on an event included in the first content, information on a threshold value for determining whether it is safe to access the first content through a first score, a second score, and the first application may be stored in the memory 110.

In addition, various information necessary within the scope for achieving an example object(s) may be stored in the memory 110, and the information stored in the memory 110 may be updated as it is received from a server or an external device or input by a user.

The processor 120 controls the overall operation of the electronic device 100. Specifically, the processor 120 may be connected, directly or indirectly, to a component of the electronic device 100 including the memory 110 as described above, and may execute at least one command stored in the memory 110 as described above to control the overall operation of the electronic device 100.

The processor 120 may be implemented in various manners. For example, the processor 120 may be implemented as at least one of an application specific integrated circuit (ASIC), an embedded processor, a microprocessor, hardware control logic, a hardware finite state machine (FSM), and a digital signal processor (DSP). Meanwhile, the term of processor 120 may be used to include a central processing unit (CPU), a graphics processing unit (GPU), a main processing unit (MPU), and the like.

In particular, in various embodiments, the processor 120 may acquire a first score for the relationship between the first content and the user's privacy and a second score for the security of each of the at least one application that may access the first content, determine whether to block access to the first content through the first application based on the first score and the second score, and control access to the first content through the first application according to a result. Hereinafter, each step of a specific control process by the processor 120 and various embodiments thereof are described in detail.

The processor 120 may acquire the first score for the relationship between the first content and the user's privacy based on the information on a person included in the first content and the information on an event included in the first content.

Specifically, when the first content is acquired, the processor 120 may acquire information on a person included in the first content. The information on a person may include information on the user of the electronic device 100, information on another person different from the user, and information on a relationship between the user and the other person.

Specifically, the processor 120 may identify a person included in the first content. In particular, when the first content includes an image, the processor 120 may perform object recognition on the image included in the content to identify an object included in the first content and identify a person corresponding to the identified object as a person included in the first content. Here, if the person identified as being included in the first content is a person other than the user, the processor 120 may acquire information on a relationship between the user and the other person based on at least one of information on messages transmitted and received between the user and the other person, information acquired through a second application related to social media of the other person, and information included in second content related to the other person.

For example, when the acquired first content includes an image, the processor 120 may perform object recognition on the acquired image to identify an object included in the first content, and identify that the identified object corresponds to a person named Nicole based on pre-stored contact information or personal information including face information of acquaintances. When it is identified that the person included in the first content is Nicole, the processor 120 may acquire information indicating that "a relationship between the user and Nicole is lovers" based on the information on messages transmitted and received between Nicole and the user of the electronic device 100, information included in the second content related to Nicole, etc.

More specifically, information on messages sent and received between the user and the other person may include not only the contents of calls, texts, and mails sent and received between the user and the other person but also information on the number, timing and frequency of messages sent and received between the user and the other person. Meanwhile, the second content refers to content different from the first content, and acquiring information on a relationship between the user and the other person based on the information included in the second content may refer to acquiring information on a relationship between the user and the other person based on the contents, the number, and the like, of the second content related to the other person. Meanwhile, the information acquired through the second application related to the social media of the other person may include information on a main event of the other person acquired through the second social media application in which the other person has an account.

Meanwhile, when the first content is acquired, the processor 120 may acquire information on an event included in the first content. The information on the event may be acquired based on at least one of information on an acquisition time of the first content, information on an acquisition location of the first content, and information on the user's schedule. The information on the acquisition location of the first content may be acquired based on location information detected through the sensor 160 and information on a background included in the first content.

For example, the processor 120 may acquire information indicating that the event included in the first content is "amusement park date with Nicole" based on information indicating that the first content was acquired at 7 p.m. on Dec. 24, 2019, information indicating that the first content was acquired at an amusement park, and information on a schedule that the user had an appointment with Nicole on Dec. 24, 2019.

As described above, when the information on a person included in the first content and information on an event included in the first content are acquired, the processor 120 may acquire a first score regarding a relationship between the first content and the user's privacy based on the information on a person included in the first content and the information based on the event included in the first content.

As described above, the first score refers to a measure indicating how closely the information included in the first content is related to the user's privacy. Specifically, the first score may be acquired according to a predefined rule based on information on a person included in the first content and information on the event included in the first content and may also be acquired through an artificial intelligence model trained to output the first score corresponding to the input information on a person included in the first content and the information on the event included in the first content. Hereinafter, it is assumed that as a value of the first score is higher, the information related to the user's privacy included in the first content is more sensitive from the user's point of view and a maximum or large value of the first score is 1.0.

For example, as in the above example, as information on a person included in the first content, when the information indicating that "the relationship between the user and Nicole is lovers" is acquired as information on a person included in the first content and the information of "amusement park date with Nicole" is acquired as information on the event included in the first content, the processor 120 may acquire "0.51" as the first score for the first content. For another example, when the information indicating that the "relationship between the user and Nicole is a lover" is acquired as information on a person included in the first content and information of "pool date with Nicole" is acquired as information on an event included in the first content, the processor 120 may acquire "0.75" as a first score for the first content. As another example, when information indicating that "the relationship between the user and Nicole is ex-lovers" is acquired as information on a person included in the first content and information of "amusement park date with Nicole" is acquired as information on an event included in the first content, the processor 120 may acquire "0.97" as the first score for the first content.

Meanwhile, the processor 120 may set a specific type of information among the information on the user and the information on the other person included in the information on a person as sensitivity information, and whether the first content includes predetermined sensitivity information may also affect the first score. The sensitivity information may be set based on data for each user, such as a search word input by the user to a Web browser, or the like, as well as predetermined information based on data on a configuration type of sensitivity information stipulated in the personal information laws of each country, such as a passport number, a social security number, and an account number, etc. Specific examples of sensitivity information are described below with reference to FIGS. 5 and 6D.

Meanwhile, the processor 120 may acquire a second score for the security of each of at least one application that may access the first content. Specifically, the electronic device may acquire a second score on a first application based on information on security of a channel transmitting data for the first application and information on security of a server receiving the data for the first application.

As described above, the second score refers to a measure indicating a risk that information related to the user's privacy included in the content is leaked to an external device without permission through each application. Specifically, the second score may not only be acquired according to a predefined rule based on information on the security of a channel for transmitting data for the first application and information on the security of a server that receives the data for the first application, but also be acquired through an artificial intelligence model trained to output the second score corresponding input information for the information on the security of the channel for transmitting data for the first application and information on the security of the server that receives the data for the first application. Hereinafter, it is assumed that, for example, as value of the second score is higher, the risk of the user's privacy-related information included in the first content is leaked to an external device without permission increases, and a maximum value of the second score is 1.0.

For example, when information indicating that a channel for transmitting data for the first application performs communication with a server through hypertext transfer protocol (HTTP) is acquired and evaluation information indicating that the security of the server that receives the data for the first application is low is acquired, the electronic device may acquire "0.90" as the second score for the first application. Meanwhile, when information indicating that the channel for transmitting data for the first application performs communication with the server through hypertext transfer protocol secure (HTTPS) is acquired and evaluation information indicating that the security of the server that receives the data for the first application is high is acquired, the electronic device may acquire "0.10" as the second score for the first application.

Specifically, information on the security of a channel for transmitting data for the first application and information on the security of a server receiving data for the first application may be acquired by analyzing metadata including information on access rights (privilege), policy, content, etc. of the first application and a software structure, such as source code and execution code for data processing and transmission of the first application, etc. and may also be acquired by receiving previously constructed evaluation information from an external device.

More specifically, the second score for the security of the first application may be acquired based on a process of analyzing metadata, such as a manifest file included in the first application, and acquiring information on access rights and information on whether there is no unnecessary information request, etc. In addition, the second score for the security of the first application may be acquired based on information on a transmission path of data acquired by analyzing a server/terminal URL included in a source code of the first application and transmission API code, information on the security of the first application evaluated by an external user or an external institution, information on vulnerabilities opened for the security of the first application, and the like.

Meanwhile, when a request for accessing a first content through the first application among the at least one application is received, the processor 120 (comprising processing circuitry) may determine whether to block access to the first content through the first application based on the first score corresponding to the first content and the second score corresponding to the first application.

Specifically, if a value obtained by subtracting the first score corresponding to the first content from the second score corresponding to the first application is less than a predetermined threshold value, the processor 120 may determine to block access to the first content through the first application. Conversely, if the value obtained by subtracting the first score corresponding to the first content from the second score corresponding to the first application is equal to or greater than the predetermined threshold value, the processor 120 may determine not to block access to the first content through the first application.

In other words, the processor 120 may allow access to the first content through the first application only when the security of the first application is sufficiently high enough to offset the sensitivity of the first content. The predetermined threshold value is a criterion for determining whether it is safe to access the first content through the first application, and of course, the predetermined threshold value may be changed by the electronic device or the user.

For example, if the threshold value is previously set to "0.20", the second score corresponding to the first application is "0.70", and the first score corresponding to the first content is "0.60", then a value obtained by subtracting the first score corresponding to the first content from the second score corresponding to the first application is "0.10" that is less than the predetermined threshold value, and thus, the processor 120 may determine to block access to the first content through the first application. Meanwhile, if the threshold value is previously set to "0.20", the second score corresponding to the first application is "0.70", and the first score corresponding to the first content is "0.40", then a value obtained by subtracting the first score corresponding to the first content from the second score corresponding to the first application is "0.30" that is greater than or equal to the predetermined threshold value, and thus, the processor 120 may determine not to block access to the first content through the first application.

As another example, if the threshold value is previously set to "0.20", the second score corresponding to the first application is "0.90", and the first score corresponding to the first content is "0.60", then a value obtained by subtracting the first score corresponding to the first content from the second score corresponding to the first application is "0.30" that is greater than or equal to the predetermined threshold value, and thus, the electronic device may determine not to block access to the first content through the first application. Meanwhile, if the threshold value is previously set to "0.20", the second score corresponding to the first application is "0.50", and the first score corresponding to the first content is "0.60", then a value obtained by subtracting the first score corresponding to the first content from the second score corresponding to the first application corresponding to the first content is "–0.10" that is less than the predetermined threshold value, and thus, the electronic device may determine to block access to the first content through the first application.

Meanwhile, the present disclosure is not limited to the embodiment as described above, and a process of determining whether to block access to the first content through the first application based on the first score corresponding to the first content and the second score corresponding to the first application may be implemented in various manners.

For example, if a value obtained by subtracting the second score corresponding to the first application from the first score corresponding to the first content is equal to or greater than a predetermined threshold value, the electronic device may determine to block access to the first content through the first application, and if the value obtained by subtracting the second score corresponding to the first application from the first score corresponding to the first content is less than the predetermined threshold value, the electronic device may determine not to block access to the first content through the first application.

In addition, if the first score for the first content is equal to or greater than the predetermined first threshold value and the second score for the first application is equal to or greater than the predetermined second threshold value, the electronic device may determine to block access to the first content through the first application, and if either the first score for the first content is less than the predetermined first threshold value or the second score for the first application is less than a predetermined second threshold value, the electronic device may determine not to block access to the first content through the first application. The first threshold value and the second threshold value mean that a criterion for determining the sensitivity of the content and a criterion for determining the security of the application are independently previously set.

If it is determined to block access to the first content through the first application, the processor 120 may provide a list of contents excluding the first content to the first application. In detail, when a request for accessing all the contents for which the first application has authority is received through the first application, the processor 120 may provide a list of contents excluding the first content to the first application.

More specifically, the processor 120 may provide a content list excluding the first content to the first application at a Kernel SystemCall level callable at an OS level, may provide a content list excluding first content at a platform API level callable at an application to the first application, or may provide a content list excluding first content at an API level usable in an environment that is embedded and executed in a platform, such as a web browser or runtime, to the first application.

Meanwhile, in the above, the process of determining whether to block access has been described based on the assumption that a request for accessing the first content is received through the first application. However, according to another embodiment, the processor 120 may determine to block access according to a user account requesting an access through the first application.

Meanwhile, according to an example embodiment, if a value obtained by subtracting the first score corresponding to the first content 10 from the second score corresponding to the first application 20 is less than a predetermined threshold value, the processor 120 may provide a content list including the first content to the first application, but prior to that, an anonymization process may be performed on a portion related to the user's privacy in the first content.

The portion related to the user's privacy may be identified through the process of acquiring the first score based on the information on a person included in the first content and information on an event included in the first content as described above. In addition, the anonymization process may include a method of completely damaging a portion related to the user's privacy, a method of damaging a portion related to the user's privacy but separately storing the portion related to the user's privacy so that the portion may be restored later, and the like. Meanwhile, the method of damaging the portion related to the user's privacy but enabling restoration later may be performed by generating undamaged entire image information, coordinate information corresponding to the portion related to the user's privacy in the entire image, decoding information for releasing a password for the damaged portion, and the like.

Meanwhile, after performing anonymization on the portion related to the user's privacy in the first content, the processor 120 may control a communication device 130 to transmit the anonymized first content to an external device. In addition, the processor 120 may control the communication device 130 to transmit the processed first content to an external device after processing to anonymize the portion related to the user's privacy after the lapse of a predetermined validity period.

Meanwhile, if it is determined to block access to the first content through the first application, the processor 120 may transmit a control signal for blocking access to the first content through an external device or deleting the first content stored in the external device, as well as blocking access to the first content through the first application, to the external device.

Meanwhile, in the above, an embodiment in which access to the first content through the first application is blocked by the processor 120 if the value obtained by subtracting the first score corresponding to the first content 10 from the second score corresponding to the first application 20 is less than a predetermined threshold value has been described, but according to another embodiment, the processor 120 may control the communication device 130 to transmit the first content to the external device through a predetermined communication protocol and may provide a user interface for selecting whether to block access to the first content may be provided through an output device 140. A more detailed description thereof will be described below with reference to FIG. 3.

Figure 3:
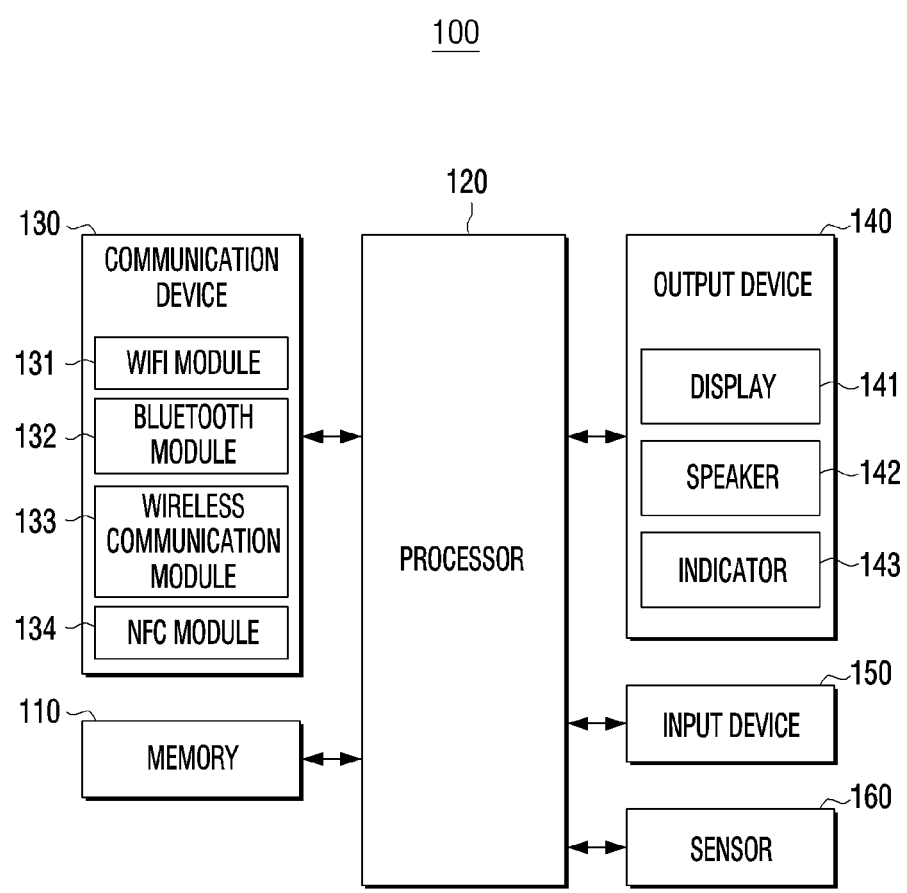
FIG. 3 is a block diagram specifically illustrating a configuration of the electronic device 100 according to an example embodiment.

FIG. 3 is a block diagram illustrating in detail a configuration of the electronic device 100 according to an example embodiment.

As shown in FIG. 3, the electronic device 100 according to an example embodiment may further include the communication device 130, an input device 150, the output device 140, and a sensor 160, as well as the memory 110 and the processor 120. However, such a configuration is an example, and a new component may be added or some components may be omitted in addition to such a configuration in carrying out example embodiment(s). Since the memory and the processor have been described above with reference to FIG. 2, the communication device 130, the input device 150, the output device 140, and the sensor 160 will be described below.

The communication device 130 includes a circuit and may communicate with an external device (e.g., a server). Specifically, the processor 120 may receive various data or information from an external device connected through the communication device 130 comprising communication circuitry, and may transmit various data or information to the external device.

The communication device 130 may include at least one of a WiFi module 131, a Bluetooth module 132, a wireless communication module 133, and a near-field communication (NFC) module 134. Specifically, each of the WiFi module 131 and the Bluetooth module 132 may perform communication using a WiFi method and a Bluetooth method. In the case of using the WiFi module 131 or the Bluetooth module 132, various connection information, such as an SSID, may be first transmitted and received to connect the WiFi module 131 and the Bluetooth module 132 for communication, and then various information may be transmitted and received.

In addition, the wireless communication module 133 may perform communication according to various communication standards, such as IEEE, Zigbee, 3rd generation (3G), 3rd generation partnership project (3GPP), long term evolution (LTE), 5th generation (5G), etc. In addition, the NFC module 134 may perform communication according to an NFC method using a 13.56 MHz band, among various RF-ID frequency bands, such as 135 kHz, 13.56 MHz, 433 MHz, 860 to 960 MHz, 2.45 GHz, etc.

In particular, if the value obtained by subtracting the first score corresponding to the first content 10 from the second score corresponding to the first application 20 is less than a predetermined threshold value, the processor 120 may control the communication device 130 to transmit first content to an external device through a predetermined communication protocol. More specifically, the processor 120 may forcibly apply a predetermined communication protocol to at least one of the channels for transmitting data for the first application through a method of requesting for the first application or a method of applying at a platform (kernel) level.

The predetermined communication protocol refers to a communication protocol, such as transport layer security ((TLS), IETF RFC8446) or http strict transport security ((HSTS), IETF RFC6797). Specifically, TLS is an encryption protocol for performing key exchange and authentication procedures between devices to prevent or reduce important information from being exposed during data transmission between devices in a transport layer of a communication process using a TCP/IP network. Meanwhile, HSTS is a method for forcing the use of HTTPS at a client level, and refers to a method of automatically connecting to a web page using HTTPS even if a user inputs an HTTP address in a web browser, once HSTS is applied.

Meanwhile, the aforementioned embodiment is based on that at least one of the channels for transmitting data for a first application supports a predetermined communication protocol, and unless all of the channels for transmitting data for the first application support the predetermined communication protocol, the processor 120 may block transmission of the first content to the external device through the first application.

The output device 140 includes a circuit, and the processor 120 may output various functions that the electronic device 100 may perform through the output device 140. In addition, the output device 140 may include at least one of a display 141, a speaker 142, and an indicator 143.

The display 141 may output image data under the control of the processor 120. Specifically, the display 141 may output an image pre-stored in the memory 110 under the control of the processor 120. In particular, the display 141 according to an example embodiment may display a user interface stored in the memory 110. The display 141 may be implemented as a liquid crystal display (LCD) panel, an organic light emitting diodes (OLED), etc., and the display 141 may be implemented as a flexible display, a transparent display, etc. in some cases. However, the display is not limited to a specific type. The speaker 142 may output audio data under the control of the processor 120, and the indicator 143 may be lit under the control of the processor 120.

In particular, according to various embodiments, the output device 140 may output a user interface for selecting whether to block access to the first content. Specifically, when the value obtained by subtracting the first score corresponding to the first content 10 from the second score corresponding to the first application 20 is less than a predetermined threshold value, the processor 120 may provide a user interface for selecting whether to block access to the first content through the output device 140.

The user interface for selecting whether to block access may include an element for receiving a user notification for security and a user's selection command. For example, the user notification may be a user notification, such as "The XXX Gallery app is about to access a photo related to Nicole. Do you want to allow it?", and an element for receiving the user's selection command may be an element, such as "Yes" and "No".

The input device 150 may include a circuit, and the processor 120 may receive a user command for controlling the operation of the electronic device 100 through the input device 150. Specifically, the input device 150 may include a microphone (not shown), a camera (not shown), and a remote control signal receiver (not shown). Also, the input device 150 may be implemented as a touch screen and included in a display.

In particular, in various embodiments, when a user notification, such as "The XXX Gallery app is about to access a photo related to Nicole. Do you want to allow it?" and a user interface including an element for receiving a user's selection command, such as "Yes" and "No" are provided through the output device 140, the input device 150 may receive a user input for selecting the element, such as "Yes" or "No". Also, when a user input selecting the element of "Yes" is received, the processor 120 may allow access to a photo related to Nicole, and when a user input selecting the element of "No" is received, the processor may block access to the photo related to Nicole.

The sensor 160 may detect various types of information. Specifically, the sensor 160 may include various sensors, such as a touch sensor, a motion sensor, a temperature sensor, a humidity sensor, and an illuminance sensor. In particular, according to an example embodiment, the sensor 160 may include a location information sensor capable of detecting location information, such as a GSP sensor. In addition, when the first content is acquired, the processor 120 may acquire information on an event included in the first content by using information on a location where the first content is acquired, which is sensed through the location information sensor.

According to an example embodiment as described above, the user's privacy may be protected in consideration of the relationship between each content and the privacy of the individual user.

Specifically, the electronic device may determine whether to block access to the content by considering the relationship to the user's privacy and the security of each application for each content, and when the information related to the user's privacy is changed, whether to block access to the content may be re-determined accordingly, thereby dynamically strengthening protection of the user's privacy.

FIG. 4 is a table illustrating various information used in a process of acquiring a first score.

As described above, the electronic device 100 may acquire the first score for the relationship between the content and the user's privacy based on the information on a person included in the content and the information on the event included in the content. In addition, the information on a person may include information on the user of the electronic device 100, information on another person different from the user, and information on a relation between the user and another person.

Hereinafter, various information used in the process of acquiring the first score for a plurality of contents will be described with reference to the table of FIG. 4, based on the assumption that the plurality of contents are image contents. Specifically, in the table of FIG. 4, each column represents a variety of information used in the process of acquiring the first score, and the information represented by each column will be described below.

First, the information described in a 'file name' column of FIG. 4 indicates a file name of each of the plurality of contents, and the file name serves as information for identifying each of the plurality of contents.

The information described in a 'person' column of FIG. 4 indicates identification information (e.g., a name) of a person identified in each of the plurality of contents. As described above, when the content includes an image, the electronic device 100 may identify an object included in the image by performing object recognition on the image, and identify a person corresponding to the identified object as a person included in the content.

The information described in a 'relationship' column of FIG. 4 indicates information on a relationship between the user and the person identified in each of the plurality of contents. In the 'relationship' column of FIG. 4, a predetermined numerical value is written along with the name of a person identified in each of the plurality of contents, which quantifies how sensitivity information on a relationship between the person identified in each of the plurality of contents and the user has from a point of view of the user's privacy.

Specifically, if the person identified as included in the content is a person other than the user, the electronic device 100 may acquire information on the relationship between the user and the other person based on at least one of information on a message transmitted and received between the user and the other person, information acquired through a second application related to the social media of the other person, and information included in other content related to the other person, and quantity the information to be expressed. As described below, the quantified numerical value may be arithmetically used in acquiring the first score.

The information described in a 'time' column of FIG. 4 indicates a generating time of each of the plurality of contents, and the information described in a 'location' column of FIG. 4 indicates a generating position of each of the plurality of contents. Specifically, in the 'location' column, LAT stands for latitude, LON stands for longitude, and ALT stands for altitude. That is, the information described in the 'location' column indicates a geographic location where each of the plurality of contents is generated.

The information described in a 'place' column of FIG. 4 indicates information on a specific place from which a plurality of contents are acquired, and specifically, the information on the place may include information on a name and address, etc. of a place. In particular, the information on the place may be acquired based on information on a background included in each content, as well as a geographic location where each of the plurality of contents as described above is generated.

The information described in an 'event' column of FIG. 4 indicates information on an event included in each of a plurality of contents. In the event column of FIG. 4, a certain numerical value is described along with information on an event included in each of a plurality of contents, which is a numerical value quantifying how sensitivity information on each event has in terms of user privacy.

Specifically, the electronic device 100 may acquire information on an event of each of a plurality of contents based on at least one of information on a content acquisition time, information on a content acquisition location, and information on a user's schedule, and quantify the obtained information to be expressed. Also, as described below, the quantified numerical value may be arithmetically used to acquire the first score.

The information described in a 'sensitivity information' column of FIG. 4 indicates predetermined sensitivity information included in each of the plurality of contents. Specifically, the electronic device 100 may set a specific type of information, among the information on a user and the information on the other person included in the information on a person as sensitivity information. Specifically, sensitivity information may be previously set based on data for a configuration format of sensitivity information stipulated in each country's personal information laws, such as the European Union-General Data Protection Regulation (EU-GDPR) and the California Consumer Privacy Act (CCPA). For example, the sensitivity information may include a license number, card number, address, e-mail address, password, and the like, as well as a passport number, social security number, airline ticket number, and account number as described in FIG. 4.

Meanwhile, the sensitivity information may be set based on user-specific data, such as a search word input by the user into a web browser. In addition, the sensitivity information may include identification information, such as a vehicle number parked on a road, a trade name and a phone number included in a signboard around the street, and the like.

The information described in the 'first score' column of FIG. 4 represents a first score for the relationship between each of a plurality of contents and the user's privacy. Specifically, the electronic device 100 may acquire the first score for the relationship between each of the plurality of contents and the user's privacy based on the information on a person and the information on an event included in each of the plurality of contents. Also, as described above, since the information on a person includes predetermined sensitivity information, whether the content includes predetermined sensitivity information may also affect the first score.

In the above, various information used in the process of acquiring the first score has been described with reference to FIG. 4, but the present disclosure is not limited thereto. That is, as long as information indicates how closely it is related to the user's privacy, the information other than the aforementioned information may also be used in the process of acquiring the first score.

In addition, in the above description, the process of acquiring information on a person included in the content by performing object recognition on the image has been described on the assumption that the content includes an image. However, when the content includes a voice, automatic speech recognition (ASR) may be performed to acquire various information included in the content, and when the content includes text, natural language processing may be performed on the text to acquire various information included in the content. Also, in performing object recognition, ASR, and natural language processing (NLP), each trained artificial intelligence model may be used.

Figure 5:
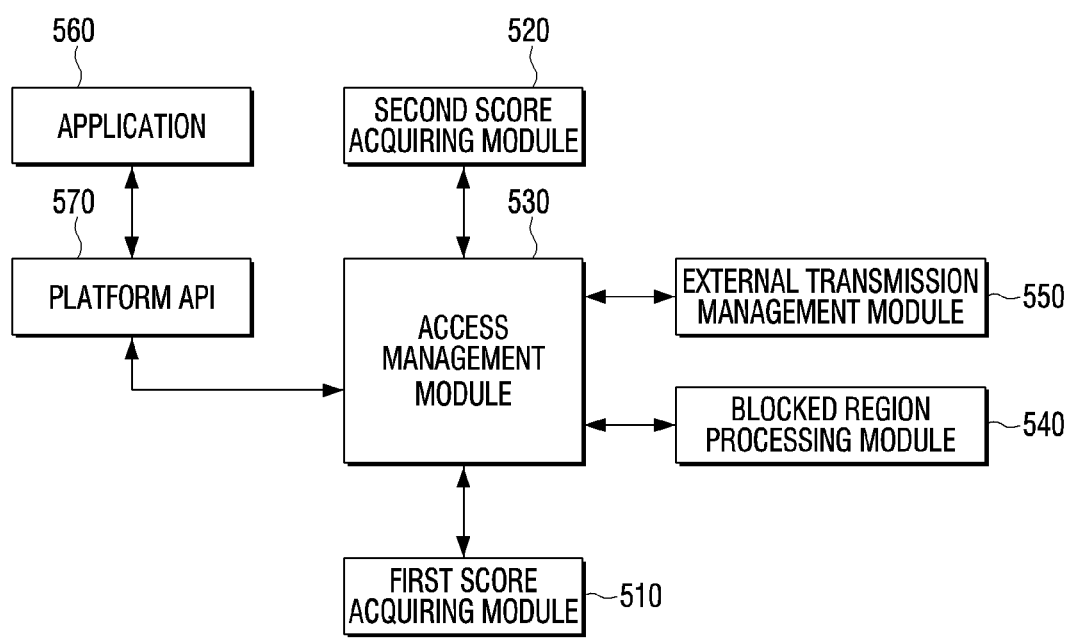
FIG. 5 is a diagram specifically illustrating a module comprising software according to an example embodiment.

FIG. 5 is a diagram illustrating in detail a software module according to an example embodiment.

As shown in FIG. 5, a software module according to an example embodiment may include a plurality of modules, such as a first score acquiring module 510, a second score acquiring module 520, an access management module 530, and a blocked region processing module 540, and an external transmission management module 550. Also, the processor may perform a control process through the plurality of modules as shown in FIG. 5.

The first score acquiring module 510 refers to a module for acquiring a first score for the relationship between content and the user's privacy. Specifically, the first score acquiring module 510 may acquire the first score for the relationship between the content and the user's privacy based on information on a person included in the content and the information on an event included in the content.

More specifically, the first score acquiring module 510 may acquire various information as described above with reference to FIG. 4, and may acquire a first score for each of a plurality of contents based on the acquired various information. The first score acquiring module 510 may acquire the first score according to a predefined rule based on information on a person included in the content and information on an event included in the content, and may also acquire the first score through an artificial intelligence model trained to output a corresponding first score when information on an event included in the content is input.

Meanwhile, various information that is a basis for acquiring the first score may be continuously added and updated, and accordingly, the first score may also be continuously updated. Also, in particular, when the first score acquiring module 510 includes the trained artificial intelligence model, the artificial intelligence model may be trained based on various updated information and the first score updated accordingly.

The second score acquiring module 520 refers to a module for acquiring a second score for the security of an application. Specifically, the second score acquiring module 520 may acquire the second score for an application based on information on the security of a channel transmitting data for the application and information on the security of a server receiving the data for the application.

More specifically, the second score acquiring module 520 may acquire information on the security of the channel transmitting the data for the application and the information on the security of the server receiving the data for the application by analyzing metadata including information on access privilege, policy, and consent of the application and a software structure, such as a source code and an execution code for processing and transmission of the data of the application, and acquire the second score based on the information on the security of the channel transmitting the data for the application and the information on the security of the server receiving the data for the application.

The access management module 530 refers to a module determining whether to block access to the first content through the first application based on the first score corresponding to the first content and the second score corresponding to the first application. Specifically, if a value obtained by subtracting the first score corresponding to the first content 10 from the second score corresponding to the first application 20 is less than a predetermined threshold value, the access management module 530 may determine to block access to the first content 10 through the first application 20. Conversely, if the value obtained by subtracting the first score corresponding to the first content 10 from the second score corresponding to the first application 20 is equal to or greater than the predetermined threshold value, the access management module 530 may determine not to block access to the first content 10 through the first application 20.

In addition, when a request for accessing all content for which the application has authority is received, the access management module 530 may determine whether to exclude specific content from a list of contents based on the first score and the second score, and provide a content list according to a determined result to the first application. In addition, the access management module 530 may manage the list of contents based on the information received from the first score acquiring module 510 and the blocked region processing module 540. In addition, the access management module 530 may determine whether there is a high risk of unauthorized leakage of information related to the user's privacy to an external device through a specific application based on the first score and the second score, and if it is determined that the risk of unauthorized leakage is high, the access management module 530 may dynamically reset the access right of the specific application.

The blocked region processing module 540 refers to a module for performing anonymization processing on a portion related to the user's privacy in the content. Specifically, the blocked region processing module 540 may perform anonymization on the portion related to the user's privacy by using a method of completely damaging the portion related to the user's privacy, a method of damaging the portion related to the user's privacy but separately storing the portion so that it may be restored later, etc.

The portion related to the user's privacy, which is the subject of the anonymization process, may be identified through the process of acquiring the first score based on the information on a person included in the content and the information on an event included in the content, as described above. For example, the portion related to the user's privacy may be a "face of an ex-lover" included in the content or may be a "user's social security number", which is sensitivity information included in the content.

The external transmission management module 550 refers to a module for managing a process in which content is transmitted to an external device through an application. For example, if the value obtained by subtracting the first score corresponding to the first content 10 from the second score corresponding to the first application 20 is less than a predetermined threshold value, the external transmission management module 550 may determine a communication protocol for transmitting the first content to an external device and transmit a request for applying the determined communication protocol to the access management module 530. Accordingly, the access management module 530 may forcibly apply the predetermined communication protocol to at least one of channels transmitting data for the first application through a method of requesting from the application 560 or a method of applying at a platform API 570 level, etc. The communication protocol may be a communication protocol, such as transport layer security ((TLS), IETF RFC8446) or http strict transport security ((HSTS), IETF RFC6797).

Meanwhile, the plurality of modules as described above are merely described according to an example embodiment, and the software architecture is not limited to the example shown in FIG. 5.

FIGS. 6A to 6D are diagrams illustrating in detail various embodiments of a method for blocking access to content.

Figure 6A:
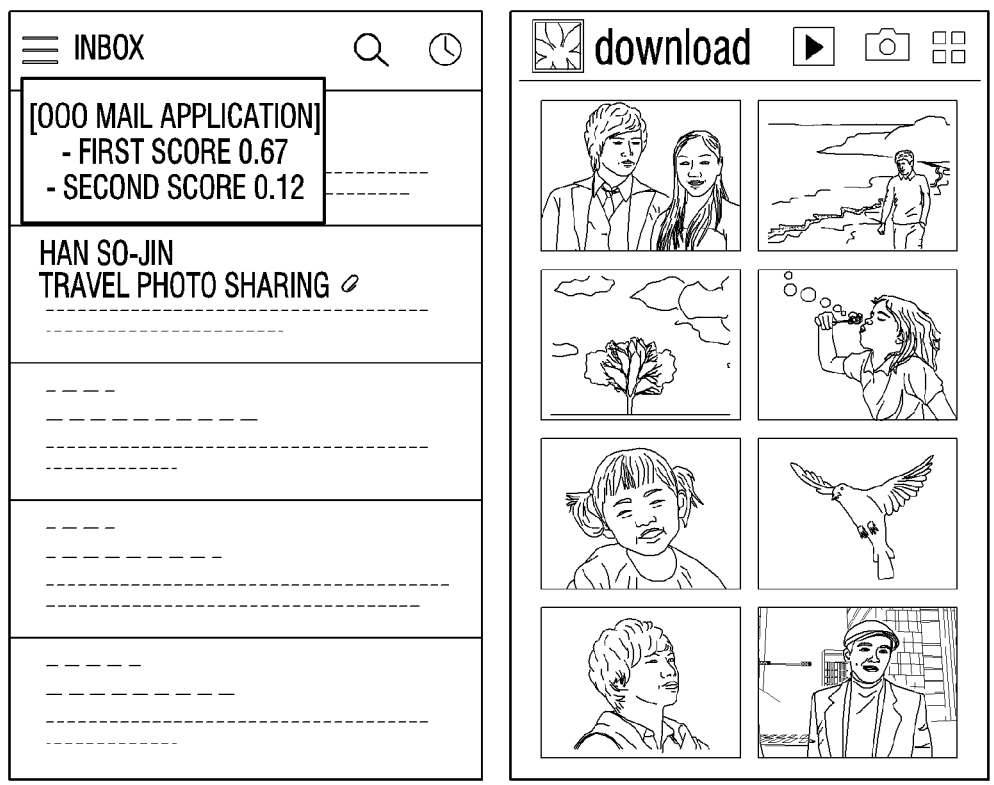
FIGS. 6A, 6B, 6C, and 6D are diagrams specifically illustrating various example embodiments of a method for blocking access to content.
Figure 6B:
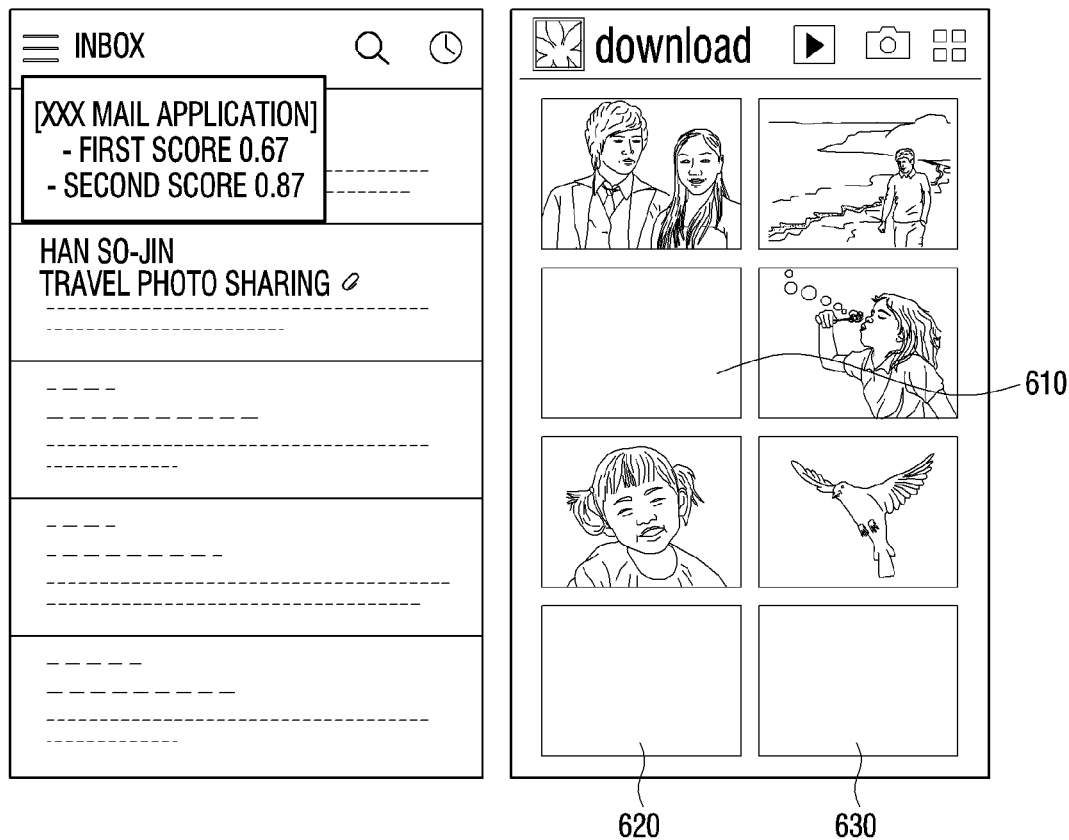

FIGS. 6A and 6B are diagrams illustrating an embodiment related to determining whether to block access to the content differently when a request for accessing the same content is received through different applications.

Specifically, as shown in FIGS. 6A and 6B, it is assumed that first content to be accessed is the same, and therefore, a first score for the first content is also equal to 0.67. Meanwhile, as shown in FIG. 6A, a second score corresponding to a first application called "OOO mail app" may be "0.12", and as shown in FIG. 6B, a second application corresponding to a second application called "XXX mail app" may be "0.87". In other words, the security of the first application may be relatively higher than that of the second application, and the security of the second application may be relatively lower than that of the first application.

In this case, when a request for accessing the first content is received from each of the first application and the second application according to a user input to select a mail "Han So-jin, travel photo sharing" to which the first content is attached, or a user input to transmit a mail to which the content stored in the electronic device is attached, the electronic device 100 may provide a content list including the first content for the first application and may provide a content list excluding the first content for the second application. Also, accordingly, as shown in FIGS. 6A and 6B, when a request for accessing content is received through the second application is received, unlike when a request for accessing content is received through the first application, access to some content 610, 620, and 630 including the first content may be blocked.

Figure 6C:
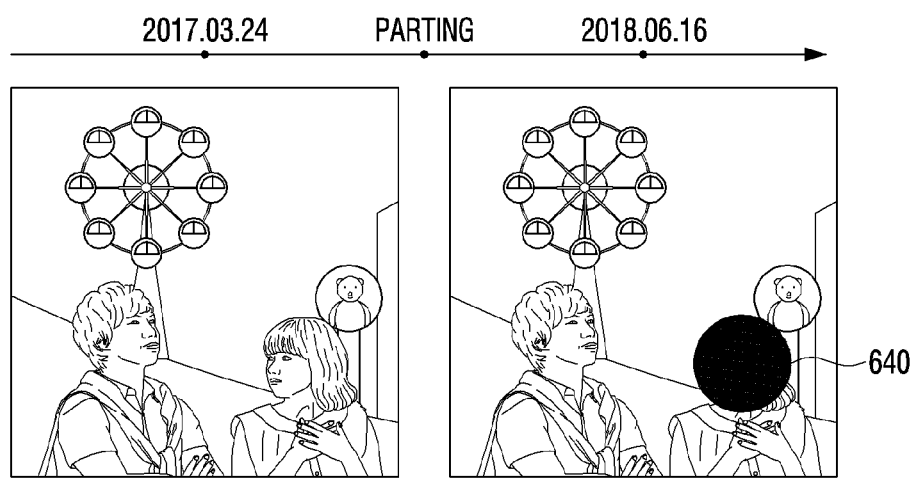

FIG. 6C is a diagram illustrating an embodiment related to differently determining whether to block the first content as information on a relationship between a user and another person is changed over time.

Referring to FIG. 6C, as of Mar. 24, 2017, the electronic device 100 may acquire information indicating that a "relationship between the user and Nicole is a lover" as information on a person included in the first content and acquire information of an "amusement park date on Nicole's 30th birthday" as information on an event included in the first content. In this case, the electronic device 100 may acquire "0.51" as the first score for the first content based on the information on a person included in the first content and the information on the event included in the first content.

Meanwhile, as shown in FIG. 6C, the relationship between the user and Nicole may be changed from "lover" to "ex-lover" during a period between Mar. 24, 2017 and Jun. 16, 2018. Accordingly, as of Jun. 16, 2018, the electronic device 100 may acquire information of a "lover whose relationship between the user and Nicole broke up" as information on a person included in the first content, and may acquire information of an "amusement park date on Nicole's 30th birthday" as information on the event included in the first content. For example, the electronic device 100 may acquire the information of the "lover whose relationship between the user and Nicole broke up" as information on a person included in the first content based on information on messages transmitted and received between the user and Nicole, information acquired through an application related to Nicole's social media, etc. In this case, the electronic device 100 may acquire "0.97" as the first score for the first content based on the information on the person included in the first content and the information on the event included in the first content.

In other words, when the information on the relationship between the user and the other person is changed, the electronic device 100 may determine the first score differently before and after a time when the information on the relationship between the user and the other person is changed, and may determine whether to block the first content differently before and after a time when the information on the relationship between the user and the other person is changed. For example, as shown in FIG. 6C, on Jun. 16, 2018, after the user and Nicole parted, a portion 640 corresponding to Nicole in the first content may be mosaiced or blurred.

Figure 6D:
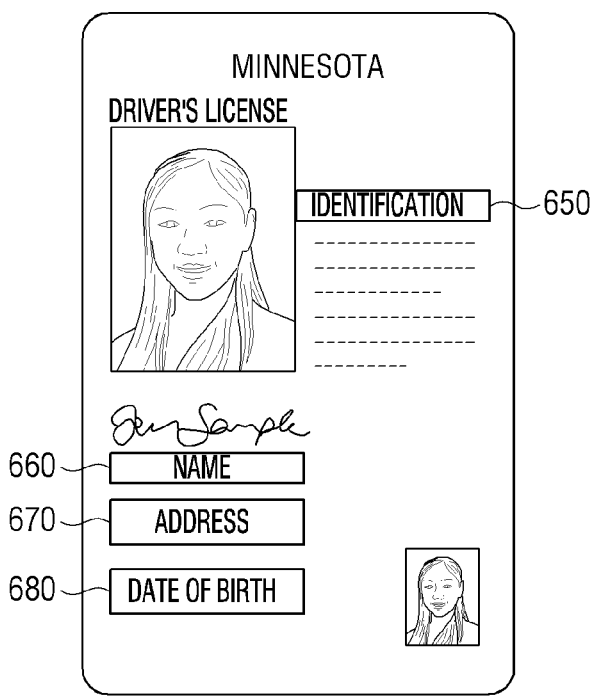

FIG. 6D is a diagram illustrating an embodiment related to performing anonymization processing on predetermined sensitivity information included in first content.

As described above, the electronic device 100 may anonymize a portion related to the user's privacy in the first content, and the portion related to the user's privacy may include, in particular, predetermined sensitivity information. In addition, the sensitivity information may be previously determined based on data on a configuration format of the sensitivity information stipulated in the personal information laws of each country.

For example, when the first content is an identification image as shown in FIG. 6D, the electronic device 100 may perform anonymization on "identification number," "name," "address," and "date of birth" which are predetermined sensitivity information in the first content. Specifically, in the first content, the electronic device 100 may synthesize images, such as "identification 650" and "name 660", "address 670", and "date of birth 680" in regions respectively corresponding to "identification number", "name", "address" and "date of birth" in the first content. In this case, the electronic device 100 may not only completely damage the original image through image synthesis, but also store the original image together with the composite image to enable restoration later.

Figure 7:
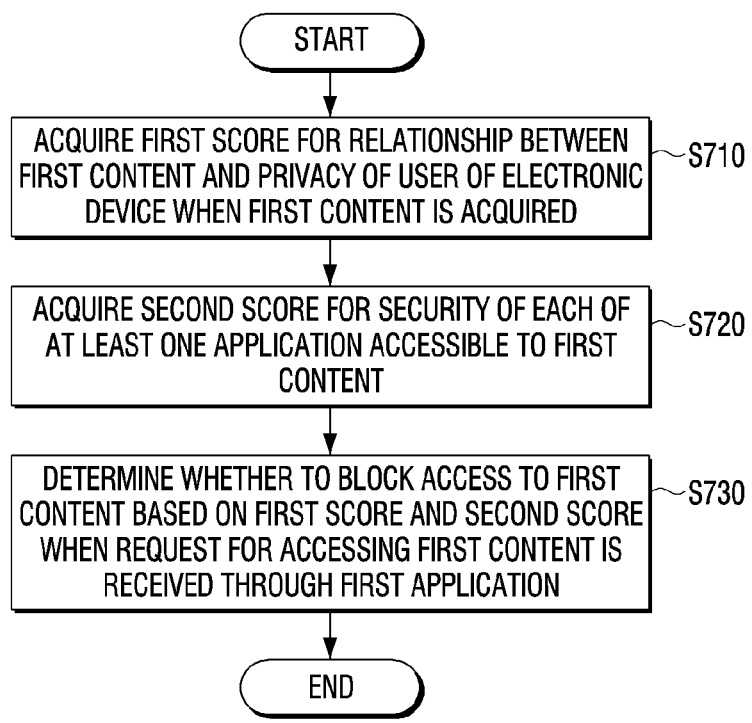
FIG. 7 is a flowchart briefly illustrating a control method according to an example embodiment.

FIG. 7 is a flowchart illustrating a control method according to an example embodiment.

As shown in FIG. 7, when the first content is acquired, the electronic device 100 may acquire a first score for a relationship between first content and the user's privacy of the electronic device 100 (S710). Specifically, the electronic device 100 may acquire a first score for the relationship between the first content and the user's privacy based on information on a person included in the first content and information on an event included in the first content.

More specifically, when the first content is acquired, the electronic device 100 may acquire information on a person included in the first content. The information on a person may include information on the user of the electronic device 100, information on another person different from the user, and information on a relationship between the user and the other person. In addition, the information on the relationship between the user and the other person may be acquired based on at least one of information on messages transmitted and received between the user and the other person, information acquired through a second application related to the social media of the other person, and information included in the second content related to the other person.

Meanwhile, when the first content is acquired, the electronic device 100 may acquire information on an event included in the first content. The information on the event may be acquired based on at least one of information on an acquisition time of the first content, information on an acquisition location of the first content, and information on the user's schedule.

Meanwhile, as described above, when the information on a person included in the first content and the information on an event included in the first content are acquired, the electronic device 100 may acquire a first score for a relationship between the first content and the user's privacy based on the information on a person included in the first content and the information on an event included in the first content.

Meanwhile, the electronic device 100 may acquire a second score for the security of each of at least one application that may access the first content (S720). The information on the event may be acquired based on at least one of information on the acquisition time of the first content, information on the acquisition location of the first content, and information on the user's schedule.

Meanwhile, when a request for accessing the first content is received through a first application, the electronic device 100 may determine whether to block access to the first content based on the first score and the second score (S730).

Specifically, if a value obtained by subtracting the first score corresponding to the first content 10 from the second score corresponding to the first application 20 is less than a predetermined threshold value, the electronic device 100 may determine to block access to the first content through the first application.

Meanwhile, the control method of the electronic device 100 according to the embodiment described above may be implemented as a program and provided to the electronic device 100. In particular, the program including the control method of the electronic device 100 may be stored and provided in a non-transitory computer readable medium.

Specifically, in the computer-readable medium including a program for executing a control method of the electronic device 100, the control method of the electronic device 100 may include, when first content is acquired, acquiring a first score for a relationship between the first content and privacy of a user of the electronic device 100 based on information on a person included in the first content and information on an event included in the first content, acquiring a second score for security of each of at least one application that is able to access the first content, and determining whether to, when a request to access the first content through a first application, among the at least one application, is received, block access to the first content through the first application based on the first score corresponding to the first content and the second score corresponding to the first application.

The non-transitory computer readable recording medium indicates a medium which stores data semi-permanently and may be read by devices, rather than a medium storing data temporarily, such as register, cache, or memory. Specifically, the above various applications or programs may be stored and provided in a non-transitory computer readable recording medium, such as CD, DVD, hard disk, Blu-ray disk, USB, memory card, or ROM.

In the above, the control method of the electronic device 100 and the computer-readable recording medium including a program for executing the control method of the electronic device 100 have been briefly described, but this is only for omitting a redundant description, and various embodiments of the device 100 may be applied to a control method of the electronic device 100 and a computer-readable recording medium including a program executing a control method of the electronic device 100.

According to an example embodiment as described above, the user's privacy may be protected in consideration of the relationship between each content and the privacy of the individual user.

In particular, the electronic device according to an example embodiment may determine whether to block access to the content by considering the relationship to the user's privacy and the security of each application for each content, and if the information related to the user's privacy is changed, the electronic device may re-determine whether to block access to the content accordingly, so that the user's privacy protection may be dynamically strengthened.

Each of components (for example, modules or programs) according to the various embodiments of the present disclosure described above may include a single entity or a plurality of entities, and some of the corresponding sub-components described above may be omitted or other sub-components may be further included in the various embodiments. Alternatively or additionally, some of the components (for example, the modules or the programs) may be integrated into one entity, and may perform functions performed by the respective corresponding components before being integrated in the same or similar manner.

Operations performed by the modules, the programs, or other components according to the various embodiments may be executed in a sequential manner, a parallel manner, an iterative manner or a heuristic manner, at least some of the operations may be performed in a different order or be omitted, or other operations may be added.

Meanwhile, the term "part" or "module" used in the present disclosure may include a unit including hardware, software or firmware, and may be used interchangeably with the term, for example, a logic, a logic block, a component or a circuit. The "part" or "module" may be an integrally formed component or a minimum unit or part performing one or more functions. For example, the module may include an application-specific integrated circuit (ASIC). Thus, each "module" herein may comprise circuitry.

The various embodiments of the present disclosure may be implemented by software including an instruction stored in a machine-readable storage medium (for example, a computer-readable storage medium). A machine may be an apparatus that invokes the stored instruction from the storage medium, may be operated based on the invoked instruction, and may include the electronic device (for example, electronic device 100) according to the disclosed embodiments.

In case that the instruction is executed by the processor, the processor may directly perform a function corresponding to the instruction or allow other components to perform the function corresponding to the instruction. The instruction may include codes provided or executed by a compiler or an interpreter.

The machine-readable storage medium may be provided in the form of a non-transitory storage medium. The "non-transitory storage medium" is a tangible device and may only indicate that this storage medium does not include a signal (e.g., electromagnetic wave), and this term does not distinguish a case where data is stored semi-permanently in the storage medium and a case where data is temporarily stored in the storage medium from each other. For example, the "non-transitory storage medium" may include a buffer in which data is temporarily stored.

According to another embodiment, the method according to the various examples disclosed in the present disclosure may be included and provided in a computer program product. The computer program product may be traded as a product between a seller and a purchaser. The computer program product may be distributed in a form of a storage medium (for example, a compact disc read only memory (CD-ROM)) that may be read by the machine, or may be distributed online (for example, downloaded or uploaded) through an application store (for example, PlayStore™) or directly between two user devices (for example, smartphones). In case of the online distribution, at least a portion of the computer program product may be at least temporarily stored in a machine-readable storage medium, such as a memory of a server of a manufacturer, a server of an application store or a relay server, or be temporarily provided.

While the disclosure has been illustrated and described with reference to various embodiments, it will be understood that the various embodiments are intended to be illustrative, not limiting. It will further be understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
   at least one processor including processing circuitry; and
   a memory storing instructions which, when executed individually and/or collectively by the at least one processor, controls the electronic device to:
   based on first content being acquired, acquire a first score for a relationship between at least the first content and privacy of a user of the electronic device based on information on at least one person included in the first content and information on an event included in the first content, wherein the first score is based on at least one person privacy value corresponding to the at least one person included in the first content and an event privacy value corresponding to the event included in the first content,
   acquire, based on information on security of a channel for transmitting data for the first application, a second score for security of each of at least one application that is able to access the first content, and determine whether to, when a request to access the first content through a first application, among the at least one application, is received, block access to the first content through the first application based on the first score corresponding to the first content and the second score corresponding to the first application.

2. The electronic device of claim 1, wherein the information on a person includes at least one of: information on the user, information on another person different from the user, and information on a relationship between the user and the other person.

3. The electronic device of claim 2, wherein the information on the relationship between the user and the other person is to be acquired based on at least one of: information on messages transmitted and received between the user and the other person, information acquired through a second application related to social media of the other person, and information included in second content related to the other person.

4. The electronic device of claim 1, wherein the information on the event is to be acquired based on at least one of: information on an acquisition time of the first content, information on an acquisition location of the first content, and information on the user's schedule.

5. The electronic device of claim 1, wherein the memory stores instructions which, when executed individually and/or collectively by the at least one processor, controls the electronic device to block access to the first content through the first application, when a value obtained by subtracting the first score corresponding to the first content from the second score corresponding to the first application is less than a predetermined threshold value.

6. The electronic device of claim 5, wherein the memory stores instructions which, when executed individually and/or collectively by the at least one processor, controls the electronic device to, when it is determined to block access to the first content through the first application, provide a list of contents excluding the first content to the first application.

7. The electronic device of claim 5, wherein the memory stores instructions which, when executed individually and/or collectively by the at least one processor, controls the electronic device to, when it is determined to block access to the first content through the first application, anonymize at least a portion of the first content and provide the first content in which at least a portion thereof is anonymized to the first application.

8. The electronic device of claim 1, further comprising:
a communication device comprising communication circuitry,
wherein the memory stores instructions which, when executed individually and/or collectively by the at least one processor, controls the electronic device to control the communication device to transmit the first content to an external device through a predetermined communication protocol, when the value obtained by subtracting the first score corresponding to the first content from the second score corresponding to the first application is less than the predetermined threshold value.

9. The electronic device of claim 1, further comprising:
an output device comprising circuitry, wherein, the memory stores instructions which, when executed individually and/or collectively by the at least one processor, controls the electronic device so that when the value obtained by subtracting the first score corresponding to the first content from the second score corresponding to the first application is less than the predetermined threshold value, a user interface for selecting whether to block access to the first content is to be provided through the output device.

10. A control method of an electronic device, the control method comprising:
when first content is acquired, acquiring a first score for a relationship between at least the first content and privacy of a user of the electronic device based on information on at least one person included in the first content and information on an event included in the first content, wherein the first score is based on at least one person privacy value corresponding to the at least one person included in the first content and an event privacy value corresponding to the event included in the first content;

acquiring, based on information on security of a channel for transmitting data for the first application, a second score for security of each of at least one application that is able to access the first content; and determining whether to, when a request to access the first content through a first application, among the at least one application, is received, block access to the first content through the first application based on the first score corresponding to the first content and the second score corresponding to the first application.

11. The control method of claim 10, wherein the information on a person includes at least one of: information on the user, information on another person different from the user, and information on a relationship between the user and the other person.

12. The control method of claim 11, wherein the information on the relationship between the user and the other person is acquired based on at least one of: information on messages transmitted and received between the user and the other person, information acquired through a second application related to social media of the other person, and information included in second content related to the other person.

13. The control method of claim 10, wherein the information on the event is acquired based on at least one of information on an acquisition time of the first content, information on an acquisition location of the first content, and information on the user's schedule.

14. A non-transitory, computer-readable recording medium including a program for executing a control method of an electronic device, the control method of the electronic device comprising:
when first content is acquired, acquiring a first score for a relationship between at least the first content and privacy of a user of the electronic device based on information on at least one person included in the first content and information on an event included in the first content, wherein the first score is based on at least one person privacy value corresponding to the at least one person included in the first content and an event privacy value corresponding to the event included in the first content;

acquiring, based on information on security of a server receiving the data for the first application, a second score for security of each of at least one application that is able to access the first content; and determining whether to, when a request to access the first content through a first application, among the at least one application, is received, block access to the first content through the first application based on the first score corresponding to the first content and the second score corresponding to the first application.

* * * * *